United States Patent [19]

Cuscurida et al.

[11] Patent Number: 4,996,294

[45] Date of Patent: Feb. 26, 1991

[54] PREPARATION OF AMINOTETRAMINES

[75] Inventors: Michael Cuscurida; Wei-Yang Su; George P. Speranza, all of Austin, Tex.

[73] Assignee: Texaco Chemical Company, White Plains, N.Y.

[21] Appl. No.: 429,673

[22] Filed: Oct. 31, 1989

[51] Int. Cl.[5] .................... C08G 65/28; C08G 65/32
[52] U.S. Cl. .............................. 528/421; 528/408; 564/505
[58] Field of Search ............... 564/505; 528/408, 421

[56] References Cited

U.S. PATENT DOCUMENTS

| | | | |
|---|---|---|---|
| 2,923,696 | 2/1960 | Harwell et al. | 260/47 |
| 3,347,926 | 10/1967 | Zech | 260/585 |
| 3,373,204 | 3/1968 | Hales et al. | 260/570.7 |
| 3,390,184 | 6/1968 | Moss et al. | 260/585 |
| 3,654,370 | 4/1972 | Yeakey | 260/584 B |
| 3,847,992 | 11/1974 | Moss | 564/505 X |
| 4,130,590 | 12/1978 | Hobbs et al. | 260/585 D |
| 4,181,682 | 1/1980 | Watts et al. | 564/505 |
| 4,235,811 | 11/1980 | Schulze et al. | 564/505 X |
| 4,383,100 | 5/1983 | Pechhold | 528/76 |
| 4,409,399 | 10/1983 | Swift et al. | 564/473 |
| 4,691,000 | 9/1987 | Collart et al. | 528/244 |

*Primary Examiner*—Earl Nielsen
*Attorney, Agent, or Firm*—Jack H. Park; Kenneth R. Priem; David L. Mossman

[57] ABSTRACT

A process in which an amine tetrol prepared by oxyalkylation of a propanediol with propylene oxide is catalytically aminated to provide, for example, an aminotetramine is disclosed. The aminotetramines are useful for preparing polyurea products and as curing agents for epoxy resins.

4 Claims, No Drawings

PREPARATION OF AMINOTETRAMINES

CROSS REFERENCE TO RELATED APPLICATIONS

This application is related to U.S. patent application for Tetramines By Animation of Dialdehyde Glycol Adducts by Michael Cuscurida, Jiang-Jen Lin and David R. McCoy Ser. No. 429,671, filed of even data and to U.S. patent application for Tetramines By Animation of Polyoxyalkylene Glycols by Jiang-Jen Lin and Michael Cuscurida, Ser. No. 429,672, filed of even date.

BACKGROUND OF THE INVENTION

1. Field of the Invention

This invention relates to aminotetramines and to a method for their preparation by the reductive animation of amino tetrols derived by propoxylation of, for example, 2-amino-2-methyl-1,3-propanediol (AMPD) or 2-amino-2-ethyl-1,3-propanediol (AEPD). The products of this invention are useful in preparing RIM elastomers, coatings and polyamides and in the curing of epoxy resins as well as in making other polyurethane products.

2. Prior Art

The amination of long alkoxylated alkyl chains terminated by hydroxyl groups is well known in the art.

U.S. Pat. No. 3,654,370 to E. L. Yeakey teaches the amination of polyoxyalkylene polyols to form the corresponding amines by means of ammonia and hydrogen over a catalyst prepared by the reduction of a mixture of the oxides of nickel, copper and chromium. The amination is carried out at a temperature of 150° to 275° C. and 500 to 5000 psig.

U.S. Pat. No. 4,409,399 to H. E. Swift et al., teaches catalyst for animating aliphatic alcohols and aldehydes. The unsupported catalyst comprises (1) copper oxide or copper hydroxide and (2) nickel oxide or nickel hydroxide, and optionally (3) an oxide or hydroxide of a Group IIA; e.g., magnesium barium, The reaction is carried out at a temperature of 150° to 250° C. and 1 to 100 atom with continuous water removal.

U.S. Pat. No. 3,390,184 to P. H. Moss et al., teaches a process for converting a secondary alcohol to a high-molecular weight primary amine by means of a hydrogenation-dehydrogenation catalyst comprising at least one member selected from the group consisting of the metals and oxides of nickel and cobalt, together with copper and a metal oxide selected from the group consisting of chromium oxide, molybdenum oxide, manganese oxide and thorium oxide. The reaction is carried out at a temperature of 225° to 260° C. and pressure of 2000 to 4000 psig, with ammonia as the aminating agent.

U.S. Pat. No. 3,373,204 to R. A. Hales et al., teaches a catalytic process for producing secondary amines from derivatives of phenols, alcohols and amines containing 5 to 40 moles of ethylene oxide and propylene oxide. The catalyst is Raney nickel with ammonia or primary alkylamines as the aminating agent. The reaction is carried out at 200° to 275° C. with the evolution of water. Amines include lauryl amine, hexadecyl amine, octadecyl amine, rosin amine and fatty acid amines.

U.S. Pat. No. 3,347,926 to J. D. Zech teaches a catalytic process for aminating primary and secondary aliphatic alcohols. The catalyst comprises a chromium-promoted Raney nickel. The reaction is carried out at 150° to 275° C. with ammonia, primary amines or secondary amines of 1 to 6 carbon atoms.

U.S. Pat. No. 2,923,696 to K. E. Harwell et al., teaches resinous compositions formed by the reaction of an epoxy resin with a high-boiling amine product. The patent further teaches hydrogenation catalysts employing copper, nickel, cobalt and oxides thereof.

U.S. Pat. No. 4,130,590 to Hobbs et al., teaches the production of long-chain unsaturated amines such as N-(alkadienyl)amines and saturated or hydrated derivatives thereof.

U.S. Pat. No. 3,654,370 to E. Pechhold teaches a process for preparing a polyurethane which is the reaction product of (a) an oligomer formal diol made by coupling segments of copolymers of tetrahydrofuran and an alkylene oxide, such as propylene oxide, with formaldehyde, (b) an organic polysiocyanate and a chain extender as exemplified by ethylene glycol, glycerine, etc.

U.S. Pat. No. 4,691,000 to Andre Collart et al., teaches a process for preparing copolymers containing oxymethylene and 2-fluoromethoxyethylene repeating units formed by copolymerizing trioxane with a derivative of a cyclic ether, such as epifluorohydrin.

SUMMARY OF THE INVENTION

This invention relates to compounds of the formula:

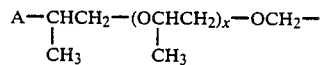

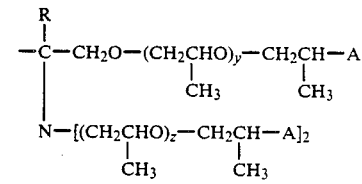

wherein:
R is alkyl of from 1 to 5 carbon atoms,
x, y and z each range from about 2 to about 50,
A is —NH$_2$ or —OH, and wherein at least one of the A substituents is —NH$_2$.

In addition to the products of this invention where the four A substituents are —NH$_2$ groups, this invention also relates to products where one, two or three of the A substituents are —NH$_2$ groups with the balance of the A substituents being —OH groups. Preferably, R is the methyl or ethyl radical.

The process for preparing the compounds of this invention comprises:
(1) alkoxylating a propanediol of the formula:

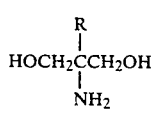

wherein R is alkyl of 1 to 5 carbon atoms with propylene oxide and in the absence of a catalyst to form an adduct of the formula:

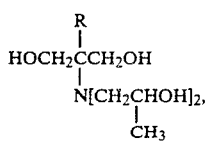

wherein R has the same meaning as previously described (2) catalytically alkoxylating the said adduct with propylene oxide to form a hindered amino tetrol having four hydroxyl-terminated oxypropylene groups, and (3) analytically aminating the said amino tetrol with ammonia and in the presence of hydrogen to form the amine product.

The products of this invention are useful for reaction with isocyanates to manufacture articles by a Reaction Injection Molding (RIM) process. Reaction Injection Molding (RIM) is a technique for the rapid mixing and molding of large, fast-curing urethane parts. RIM polyurethane parts are used in a variety of exterior body applications on automobiles where the light weight contributes to energy conservation. RIM Parts are generally made by rapidly mixing active hydrogen-containing materials with polysiocyanate and placing the mixture into a mold where reaction proceeds. After reaction and demolding, the parts may be subjected to an additional curing step which comprises placing the parts in an oven, held at 250° F. or higher.

It also has been found that the products of this invention are useful as curing agents in forming epoxy resin compositions, castings and coatings, etc. with highly satisfactory physical properties. Such epoxy products find application in a wide variety of industrial products. Polyamides can be prepared by allowing the amine products of this invention to react with dibasic acids, diesters and diacid chlorides.

DESCRIPTION OF THE PREFERRED EMBODIMENTS

The alkoxylation reaction employed in preparing the propylene oxide adduct of the propanediol initiator in the first step of the process utilized in preparing the compounds of this invention is carried out according to methods well known in the art and as described in Example 1, Runs A and D, set out in Table 1 which follows and, likewise, the oxyalkylation reaction conducted in the presence of a catalyst in the second step of the process is carried out using methods well known in the art and as described in Example 1, Runs B and C and in Runs E and F set out in Table 1.

The hindered amino tetrols are aminated as described in U.S. Pat. No. 3,654,370 to E. L. Yeakey, which describes the amination of polyoxyalkylene polyols to form the corresponding amines. The amination is conducted, for example, in the process of a catalyst prepared from a mixture of the oxides of nickel, copper and chromium and in the presence of ammonia and hydrogen at 150° to 275° C., preferably about 190° to about 240° C. and at a pressure of about 1000 to about 5000 psig, preferably at about 1500 to about 3500 psig. Other useful amination catalysts include, for example, Raney nickel, promoted Raney nickel such as molybdenum promoted Raney nickel; Ni/Cu/Cr powder;

It has been discovered that the amino tetrols formed as previously described can be reductively aminated provided the tertiary nitrogen is stearically hindered. Hindrance of the tertiary nitrogen stabilizes the molecule and thus prevents cleavage at the tertiary nitrogen by the metallic catalyst.

In the instant invention, the tertiary nitrogen atom is hindered by a pendant alkyl group attached to the carbon atom adjacent to the tertiary nitrogen and by the pendant alkyl groups of the oxyalkylene groups directly attached to the tertiary nitrogen. If the tertiary nitrogen is not hindered, the polyether chains are cleaved at the nitrogen atom, yielding a variety of decomposition products rather than the desired anminated product. It is shown in a comparative example that if attack on the tertiary nitrogen atom is not hindered, the identical process conditions yield a wide variety of degradation products. For example, when a compound such as:

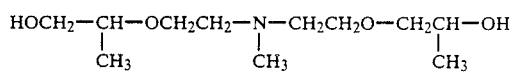

is animated, migration of the methyl group and cleavage of the chain at the nitrogen atom predominates.

The following examples which illustrate the nature of the instant invention are not intended to be limitative.

EXAMPLE 1

Preparation of an Amino Tetrol by Oxyalkylation of 2-Amino-2-Methyl-1,3-propanediol (AMPD)

In this example the amino tetrol was prepared using the following reaction sequence:

Run A—A two mole adduct of AMDP was prepared by oxyalkylation in the absence of a catalyst with propylene oxide (AMDP·2PO).

Run B—The product of Run A was reacted with additional propylene oxide to form an AMPD initiator product with a hydroxyl number of 292.2.

Run C—The product of Run B was oxyalkylated with propylene oxide to give the final amino tetrol product having a hydroxyl number of 141.

Reaction charges, details of preparation, and properties of the above-described products are shown in Table 1 which follows.

EXAMPLE 2

Preparation of an Amino Tetrol by Oxyalkylation of 2-Amino-2-Ethyl-1,3-Propanediol (AEPD)

In this example the amino tetrol was prepared using the following reaction sequence:

Run D—A two mole adduct of AEPD was prepared by oxyalkylation in the absence of a catalyst with propylene oxide (AEPD·2PO).

Run E—The product of Run D was reacted with additional propylene oxide to form an initiator product having a hydroxyl number of 267.5.

Run F—Oxyalkylation of the product of Run E with propylene oxide gave the final amino tetrol product having a hydroxyl number of 127.

Reactor charges, details of preparation, and properties of the above-described products are set out in Table 1.

EXAMPLE 3

Amination of the Amino Tetrol Prepared by Oxyalkylation of 2-Amino-2-Ethyl-1,3-Propanediol Into a one-liter stirred autoclave were charged 150 g of an amino tetrol made in Run F of Example 2 and 30 g of a powdered Ni/Cu/Cr catalyst. The reaction was then sealed and flushed twice with hydrogen. Ammonia (98.5 g) was charged into the reactor which then was filled to a total pressure of 500 psig with hydrogen. The reactor was then heated at 220° C. for five hours. The pressure peaked at 2275 psig and then dropped. The product was then stripped of lights. Analyses of the product were as follows: total acetylatables, meq/g 1.328; total amine, meq/g 0.746; primary amine, meq/g 0.454; tertiary amine, meq/g 0.254. The primary amine represented 34.2 percent of the total acetylatables, i.e., the degree of amination was 34.2 percent. The NMR spectrum confirmed the structure of the aminotetramine product.

EXAMPLE 4

Amination of the Amino Tetrol Prepared by Oxyalkylation of 2-Amino-2-Ethyl-1,3-Propanediol The procedure of Example 3 was followed except that 100 g of ammonia was charged and the reactor was heated to 235°C. The produce analyzed as follows: Total acetylatables, meq/g 1.328; total amines, meq/g 1.419; primary amine, meq/g 1.213; tertiary amine, meq/g 0.215. The primary amine represented 85.5. percent of the total acetylatables. The NMR spectrum confirmed the structure of the aminotetramine product.

EXAMPLE 5

Amination of the Amino Tetrol Prepared by Oxyalkylation of 2-Amino-2-Methyl-1,3-Propanediol The procedure of Example 3 was followed except that 150 g of the tetrol made in Run C of Example 1; 80 g ammonia, and 40 g of powdered Ni/Cu/Cr catalyst were added and the rector was heated to 235° C. and held for five hours. Analyses were as follows: total acetylatables, meq/g 1.459, total amine, meq/g 1.566, primary amine, meq/g 1.188, tertiary amine, meq/g 0.280. The primary amine represented 81.4 percent of the acetylatables. The NMR spectrum confirmed the structure of the aminotetramine product and showed only trace amounts of ether termination.

EXAMPLE 6

Amination of the Amino Tetrol Prepared by Oxyalkylation of 2-Amino-2-Ethyl-1,3-Propanediol The procedure of Example 3 was followed except that 134 g of a lower molecular tetrol made from AEPD following the procedure of Example 2 and 108 g ammonia were used. The product had the following analyses: total acetylatables, meq/g 5.062, total amine, meq/g 5.366, primary amine, meq/g 4.27, tertiary amine, meq/g 1.088. The primary amine represented 79.6 percent of the total acetylatables. The NMR spectra confirmed the structure of the aminotetramine product and showed only trace amounts of ether termination.

EXAMPLE 7

COMPARATIVE

A one-liter stirred autoclave was charged with 15.08 g of anhydrous molybdenum-promoted Raney nickel catalyst, and with 139.03 g of polypropoxylated triethanol-amine having the following analyses:

| | |
|---|---|
| Total acetylatables, meq/g | 0.549 |
| Total amines, meq/g | 0.16 |
| Tertiary amines, meq/g | 0.15 |

The autoclave was flushed with hydrogen, and 16.2 g ammonia was charged. Hydrogen was introduced until the pressure reached 352 psig.

TABLE 1

| Run | Preparation of Amino Tetrols | | | | | |
|---|---|---|---|---|---|---|
| | A | B | C | D | E | F |
| AMPD,g | 250 | — | — | — | — | — |
| AMPD.2PO,g | — | 250 | — | — | — | — |
| AMPD initiator,g | — | — | 250 | — | — | — |
| AEPD,g | — | — | — | 400 | — | — |
| AEPD.2PO,g | — | — | — | — | 250 | — |
| AEPD initiator,g | — | — | — | — | — | 250 |
| Potassium hydroxide, flaked,g | — | 5.6 | 7.0 | — | 5.6 | 7 |
| Propylene oxide,g | 281 | 622 | 1052 | 388 | 601 | 942 |
| Magnesol 30/40,g[a] | — | 40 | 56 | — | — | — |
| Details of preparation | | | | | | |
| Oxide addition time,hr. | 1.3 | 2.5 | 7.5 | 2.0 | 2.5 | 7.0 |
| Temperature °C. | 120 | 110–117 | 105–110 | 100–110 | 105–110 | 100–110 |
| Pressure, psig | 50 | 50 | 50 | 50 | 50 | 50 |
| Properties | | | | | | |
| Total amine, meq/g | 4.732 | 1.36 | 0.305 | 4.38 | 1.29 | 0.28 |
| Tertiary amine meq/g | 4.71 | 1.34 | 0.29 | 4.31 | 1.25 | 0.28 |
| Hydroxyl no., mg KOH/g | 997.5 | 292.2 | 141 | 834 | 267.5 | 127 |
| Water,wt % | — | — | 0.12 | — | — | — |
| pH in 10:6 isopropanol-water | — | — | 9.5 | — | — | 11.7 |
| Color,Pt-Co | — | — | 75 | — | — | 75 |
| Sodium,ppm | — | 2.2 | 3.0 | — | 2.8 | 11.6 |
| Potassium,ppm | — | 3.1 | 7.8 | — | 3.8 | 85 |
| Viscosity, °F., cs | | | | | | |
| 77 | — | 1510 | 521 | — | 936 | — |
| 100 | — | 481 | 245 | — | 328 | — |

[a]Synthetic magnesium silicate, Pilot Engineering Co.

The autoclave was then heated over a 40-minute period to 240.7° C. and 839 psig. The autoclave was held at 223.2°–239° C. for 20 minutes thereafter, and cooled to room temperature. After filtrating and removal of ammonia and water by stripping the filtrate on a rotary evaporator at 99° C./20 mmHg, the product had the following analyses:

| | |
|---|---|
| Total acetylatables, meq/g | 0.738 |
| Total amines, meq/g | 0.62 |
| Primary amine, meq/g | 0.47 |
| Tertiary amine, meq/g | 0.04 |

This example demonstrates that with a polypropoxylated non-hindered amine, the tertiary amine functionality is severely degraded, with only 27% of the tertiary amine functionality retained.

EPOXY RESIN COMPOSITIONS

This invention also relates to epoxy resin compositions, such as films, castings, adhesives, etc., comprising a vicinal polyepoxide having an epoxide equivalency greater than about 1.8 and a curing amount of a curing agent comprising an amine compound of this invention or comprising, in combination the amine compound and a polyoxyalkyleneamine for example, including, but not limited to polyoxyalkylenediamenes of the JEFFAMINE ® D-series as exemplified by:

JEFFAMINE ® D-230 having the formula:

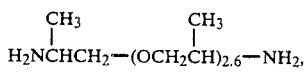

JEFFAMINE ® D-400 having the formula:

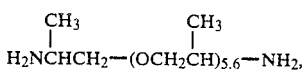

JEFFAMINE ® D-2000 having the formula:

polyoxyalkylenediamines of the EDR-series as exemplified by JEFFAMINE ® EDR-148 having the formula:

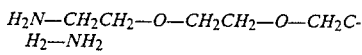

and polyoxyalkylenetriamines, such as the JEFFAMINE ® series, as exemplified by:
JEFFAMINE ® T-403 having the formula:

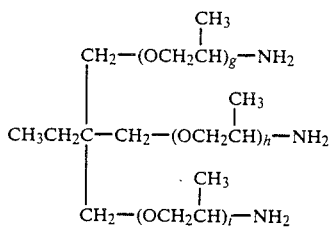

wherein the sum of g+h+i is about 5.3, and
JEFFAMINE ® T-5000 having the formula:

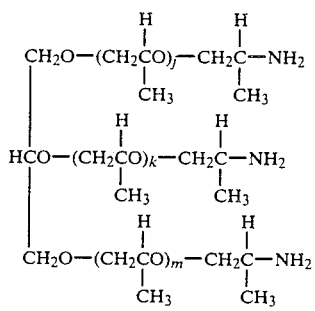

wherein the sum of j+k+m is about 85.

All of the above JEFFAMINE ® products are marketed by the Texaco Chemical Company, Houston, Tex.

When the curing agent comprises the amine compound of this invention and the polyoxyalkylenepolyamine, usually the curing agent will comprises from about 15 to about 60 weight percent of the compound with the balance being the polyoxyalkylenepolyamine.

Generally, the JEFFAMINE ® polyoxyalkylenepolyamines employed in the epoxy curing agents of this invention will have molecular weights of about 148 or more and, preferably, will have molecular weights ranging from about 230 to about 2000.

Generally, the amine-cured vicinal polyepoxide-containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphanol, novolak, resorcinol, etc. The epoxy derivatives of emthylene or isopropylidene bisphenols are especially preferred.

A widely-used class of polyepoxides which are useful according to the instant invention includes the resinous epoxy polyethers obtained by reacting an epihalohydrin, such as epichlorohydrin, etc., with either a polyhydric phenol or a polyhydric alcohol. An illustrative, but by no means exhaustive, listing of suitable dihydric phenols includes 4,4'-isopropylidene bisphpenol, 2,4'-dihydroxydiphenylethylmethane, 3,3'-dihydroxydiphenyldiethylmethane, 3,4'-diphenylmethylpropylmethane, etc.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, pollypropylene glycols, triglycerol, dipentaerythritol and the like, polyallyl alcohol, polyhydric thioethers, etc.

Another class of polymeric polyepoxides which can be amine cured in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol.

Optionally, the epoxy resin formulations of the instant invention can include an "accelerator to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., HANDBOOK OF EPOXY RESINS, pp. 7-14, describes the use of certain amine-containing compounds as epoxy curing agent-accelerators.

Many accelerators are known in the art which can be utilized in accordance with the instant invention. Examples include salts of phenols, salicylic acids, amine salts of fatty acids, such as those disclosed in U.S. Pat. No. 2,681,901, and tertiary amines such as those disclosed in U.S. Pat. No. 2,839,480.

It will further be realized that various conveniently employed additives can be admixed with the polyepoxide-containing composition of the instant invention prior to final cure. For example, in certain instances it may be desired to add minor amounts of hardeners along with various other accelerators and curing agent systems well known in the art. Additionally, conventional pigments, dyes, fillers, flame-retarding agents and the like which are compatible; natural or synthetic resins can be added.

EXAMPLE 8

Curing of an Epoxy Resin with the Animated Amino Tetrol Derived from AEDP (Product of Example 4)

Epon® 828, a diglycidyl ether of Bisphenol A made by the Shell Chemical Co. (7.8 g), and the aminated polyol derived from AEDP (i.e., the product of Example 4) (17.2 g) were mixed with a wooden spatula until solubilized. The mixture was then poured into an aluminum dish and cured for one hour at 100°–105° C. The resulting cured product was a tough, resilient polymer.

EXAMPLE 9

Curing of an Epoxy Resin with the Animated Amino Tetrol Derived from AEDP (Product of Example 4) in Combination with a Polyoxyalkylenediamine Epon® 828, a diglycidyl ether of Bisphenol A made by the Shell Chemical Co. (21.1 g), the aminated polyol derived from AEDP (i.e., the product of Example 4) and JEFFAMINE® D-400 (10 g) were mixed with a wooden spatula until solubilized. The mixture was then poured into an aluminum dish and cured for one hour at 100°–105° C. The cured product was a tough, hard polymer.

What is claimed is:

1. A compound of the formula:

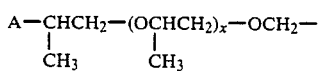

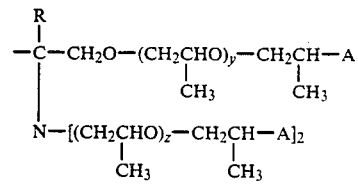

wherein:
R is an alkyl of from 1 to 5 carbon atoms,
x, y, and z each range from 2 to about 50,
A is —NH$_2$ or —OH, and wherein at least one of the A substituents is —NH$_2$.

2. The compound of claim 1 wherein A is —NH$_2$.
3. The compound of claim 1 wherein R is the methyl radical.
4. The compound of claim 1 wherein R is the ethyl radical.

* * * * *